(12) United States Patent
Hung et al.

(10) Patent No.: US 12,451,916 B2
(45) Date of Patent: Oct. 21, 2025

(54) TRANSMITTING OR RECEIVING CIRCULARLY POLARIZED SIGNALS BY LINEARLY POLARIZED ANTENNAS

(71) Applicant: MEDIATEK INC., Hsinchu (TW)

(72) Inventors: Shao-Chou Hung, Hsinchu (TW);
Bao-Chi Peng, Hsinchu (TW);
Chun-Chia Chen, Hsinchu (TW);
I-Kang Fu, Hsinchu (TW);
Abdelkader Medles, Cambridge (GB);
Gilles Charbit, Cambridge (GB)

(73) Assignee: MediaTek Inc. (TW)

( * ) Notice: Subject to any disclaimer, the term of this patent is extended or adjusted under 35 U.S.C. 154(b) by 130 days.

(21) Appl. No.: 18/299,512

(22) Filed: Apr. 12, 2023

(65) Prior Publication Data

US 2023/0336201 A1 Oct. 19, 2023

Related U.S. Application Data

(60) Provisional application No. 63/330,339, filed on Apr. 13, 2022, provisional application No. 63/330,340, (Continued)

(51) Int. Cl.
*H04B 1/16* (2006.01)
*H01Q 3/24* (2006.01)
*H01Q 15/24* (2006.01)

(52) U.S. Cl.
CPC ............ *H04B 1/1638* (2013.01); *H01Q 3/24* (2013.01); *H01Q 15/244* (2013.01); *H01Q 15/246* (2013.01)

(58) Field of Classification Search
CPC .............. H04B 1/1638; H04B 7/18513; H04B 7/0469; H04B 7/0617; H04B 7/086;
(Continued)

(56) References Cited

U.S. PATENT DOCUMENTS 6,232,921 B1 * 5/2001 Aiken .................. H04B 7/0615
342/383
6,275,192 B1 8/2001 Kim
(Continued)

FOREIGN PATENT DOCUMENTS

WO  WO 2011005269 A1  1/2011
WO  WO 2011011647 A1  1/2011

OTHER PUBLICATIONS

Combined Taiwanese Office Action and Search Report issued Nov. 7, 2023, in corresponding Taiwanese Patent Application No. 112113856 (with English Translation of Category of Cited Documents), 25 pages.
(Continued)

*Primary Examiner* — Dominic E Rego
(74) *Attorney, Agent, or Firm* — Andy M. Han; Han IP PLLC

(57) ABSTRACT

Aspects of the disclosure provide an apparatus for receiving a circularly polarized signal by linearly polarized antennas. A horizontally polarized antenna and a vertically polarized antenna of the apparatus receive a circularly polarized signal that is transmitted based on a transmitted baseband signal vector. A radio frequency (RF) module of the apparatus generates a first baseband signal vector based on the received circularly polarized signal. The first baseband signal vector includes a product of the transmitted baseband signal vector and a receiving polarization vector of the transmitted baseband signal vector. Processing circuitry of the apparatus estimates the receiving polarization vector of the transmitted baseband signal vector based on the first baseband signal vector. The processing circuitry derives a second baseband signal vector based on the estimated receiving polarization vector and the first baseband signal vector.

20 Claims, 9 Drawing Sheets

Related U.S. Application Data filed on Apr. 13, 2022, provisional application No. 63/330,341, filed on Apr. 13, 2022.

(58) Field of Classification Search
CPC ........ H01Q 15/24; H01Q 3/24; H01Q 15/244; H01Q 15/246; H04J 13/0062
See application file for complete search history.

(56) References Cited

U.S. PATENT DOCUMENTS

| | | | |
|---|---|---|---|
| 9,297,896 B1* | 3/2016 | Andrews | H01Q 3/30 |
| 10,868,609 B1* | 12/2020 | Kossin | H04B 7/10 |
| 10,892,816 B1* | 1/2021 | Struhsaker | H01Q 3/26 |
| 11,502,406 B2* | 11/2022 | Hosseini | H04B 17/318 |
| 12,003,281 B1 | 6/2024 | Huang | |
| 12,113,288 B2* | 10/2024 | Dickey | H01Q 15/246 |
| 2009/0034727 A1 | 2/2009 | Chester et al. | |
| 2011/0002364 A1 | 1/2011 | Michaels et al. | |
| 2011/0007758 A1 | 1/2011 | Macrae | |
| 2011/0026443 A1* | 2/2011 | Okada | H01P 1/17 |
| | | | 455/39 |
| 2012/0236954 A1 | 9/2012 | Siwiak et al. | |
| 2014/0050476 A1* | 2/2014 | Grigoryan | H04B 10/6162 |
| | | | 398/65 |
| 2015/0326300 A1* | 11/2015 | Fujii | H04L 5/003 |
| | | | 375/346 |
| 2016/0072530 A1 | 3/2016 | El-Hassan et al. | |
| 2017/0271781 A1* | 9/2017 | Gururaja Rao | H01Q 3/36 |
| 2018/0019818 A1* | 1/2018 | Yu | H04B 10/5165 |
| 2020/0204336 A1* | 6/2020 | Petersson | H01Q 21/08 |
| 2022/0239014 A1* | 7/2022 | Sikri | H04B 1/0067 |

OTHER PUBLICATIONS

Taiwanese Office Action issued Sep. 12, 2023 in Taiwanese Application 112113837, 7 pages.
Taiwan Intellectual Property Office, Office Action in Taiwan Patent Application No. 112113840, Sep. 20, 2024.
USPTO, Office Action in U.S. Appl. No. 18/299,115, May 28, 2025.

* cited by examiner

TRANSMITTING OR RECEIVING CIRCULARLY POLARIZED SIGNALS BY LINEARLY POLARIZED ANTENNAS

INCORPORATION BY REFERENCE

This present disclosure claims the benefit of U.S. Provisional Application No. 63/330,339, filed on Apr. 13, 2022, U.S. Provisional Application No. 63/330,340, filed on Apr. 13, 2022, and U.S. Provisional Application No. 63/330,341, filed on Apr. 13, 2022. The three U.S. Provisional Applications are incorporated herein by reference in their entirety.

TECHNICAL FIELD

The present disclosure relates to wireless communications and specifically relates to transmitting or receiving circularly polarized signals by linearly polarized antennas.

BACKGROUND

In satellite communication, it is common for satellites to transmit or receive circularly polarized signals with circularly polarized antennas. By switching right-hand circular polarization (RHCP) and left-hand circular polarization (LHCP) between two adjacent beams, the interference between two adjacent beams can be avoided and the frequency efficiency of a satellite communication system can be increased. In some related arts, however, mobile terminals (e.g., smart phones) can only transmit and receive linearly polarized signals, for example, with patch antennas. This is a common case in the terrestrial network (TN) scenario. Accordingly, it is desirable to provide a device that can transmit and receive circularly polarized signals by linearly polarized antennas.

SUMMARY

Aspects of the disclosure provide a method for receiving a circularly polarized signal by linearly polarized antennas. Under the method, a circularly polarized signal, which is transmitted based on a transmitted baseband signal vector, is received by a horizontally polarized antenna and a vertically polarized antenna of an apparatus. Based on the received circularly polarized signal, a first baseband signal vector is generated by a radio frequency (RF) module of the apparatus. The first baseband signal vector includes a product of the transmitted baseband signal vector and a receiving polarization vector of the transmitted baseband signal vector. Based on the first baseband signal vector, the receiving polarization vector of the transmitted baseband signal vector is estimated by processing circuitry of the apparatus. Based on the estimated receiving polarization vector and the first baseband signal vector, a second baseband signal vector is derived by the processing circuitry of the apparatus.

In an embodiment, the first baseband signal vector includes a first sub-vector and a second sub-vector, the first sub-vector is generated from a first portion of the circularly polarized signal received by the horizontally polarized antenna, and the second sub-vector is generated from a second portion of the circular polarized signal received by the vertically polarized antenna.

In an embodiment, based on an eigenvector of an autocorrelation matrix of the first baseband signal vector, the receiving polarization vector of the transmitted baseband signal vector is estimated by the processing circuitry of the apparatus.

In an embodiment, the eigenvector is normalized by the processing circuitry of the apparatus as the receiving polarization vector.

In an embodiment, the transmitted baseband signal vector is a reference signal that is available to the apparatus, and based on a linear channel estimation, the receiving polarization vector is estimated by the processing circuitry of the apparatus.

In an embodiment, a respective effective receiving polarization vector for each of signal samples in the transmitted baseband signal vector is estimated by the processing circuitry of the apparatus. An average of the effective receiving polarization vectors is calculated by the processing circuitry of the apparatus as the estimated receiving polarization vector In an embodiment, the reference signal is one of a Zadoff-Chu sequence, a maximum length sequence, or a constant amplitude zero autocorrelation sequence.

In an embodiment, the reference signal is allocated at beginning of a radio subframe.

In an embodiment, the reference signal uses different code sequences when transmitted over different beams.

In an embodiment, the reference signal on one beam is a discrete Fourier transform (DFT) or an inverse DFT of the reference signal on another beam.

In an embodiment, a Hermitian transposed vector of the estimated effective polarization vector is generated by the processing circuitry of the apparatus. The Hermitian transposed vector is normalized by the processing circuitry of the apparatus as a normalized Hermitian transposed vector. Based on an inner product of the normalized Hermitian transposed vector and the first baseband signal vector, the second baseband signal vector is derived by the processing circuitry of the apparatus.

Aspects of the disclosure provide an apparatus for receiving a circularly polarized signal by linearly polarized antennas. A horizontally polarized antenna and a vertically polarized antenna of the apparatus receive a circularly polarized signal that is transmitted based on a transmitted baseband signal vector. An RF module of the apparatus generates a first baseband signal vector based on the received circularly polarized signal. The first baseband signal vector includes a product of the transmitted baseband signal vector and a receiving polarization vector of the transmitted baseband signal vector. Processing circuitry of the apparatus estimates the receiving polarization vector of the transmitted baseband signal vector based on the first baseband signal vector. The processing circuitry derives a second baseband signal vector based on the estimated receiving polarization vector and the first baseband signal vector.

In an embodiment, the first baseband signal vector includes a first sub-vector and a second sub-vector, the first sub-vector is generated from a first portion of the circularly polarized signal received by the horizontally polarized antenna, and the second sub-vector is generated from a second portion of the circular polarized signal received by the vertically polarized antenna.

In an embodiment, the processing circuitry estimates the receiving polarization vector of the transmitted baseband signal vector based on an eigenvector of an autocorrelation matrix of the first baseband signal vector.

In an embodiment, the processing circuitry normalizes the eigenvector as the receiving polarization vector.

In an embodiment, the transmitted baseband signal vector is a reference signal that is available to the apparatus, and the processing circuitry estimates the receiving polarization vector based on a linear channel estimation.

In an embodiment, the processing circuitry estimates a respective effective receiving polarization vector for each of signal samples in the transmitted baseband signal vector. The processing circuitry calculates an average of the effective receiving polarization vectors as the estimated receiving polarization vector.

In an embodiment, the reference signal is one of a Zadoff-Chu sequence, a maximum length sequence, or a constant amplitude zero autocorrelation sequence.

In an embodiment, the reference signal is allocated at beginning of a radio subframe.

In an embodiment, the processing circuitry generates a Hermitian transposed vector of the estimated receiving polarization vector, normalizes the Hermitian transposed vector as a normalized Hermitian transposed vector, and derives the second baseband signal vector based on an inner product of the normalized Hermitian transposed vector and the first baseband signal vector.

Aspects of the disclosure provide a method for transmitting a circularly polarized signal by linearly polarized antennas. Under the method, a first circularly polarized signal, which is transmitted based on a transmitted baseband signal vector, is received by a horizontally polarized antenna and a vertically polarized antenna of an apparatus. Based on the received first circularly polarized signal, a received baseband signal vector is generated by an RF module of the apparatus. The received baseband signal vector includes a product of the transmitted baseband signal vector and a receiving polarization vector of the transmitted baseband signal vector. Based on the received baseband signal vector, the receiving polarization vector of the transmitted baseband signal vector is estimated by processing circuitry of the apparatus. Based on the estimated receiving polarization vector, power amplifiers (PAs) and local oscillator (LO) signals of frequency converters in the RF module are calibrated by the processing circuitry of the apparatus. Based on the calibrated PAs and the calibrated LO signals of the frequency converters in the RF module, a second circularly polarized signal is transmitted by the horizontally polarized antenna and the vertically polarized antenna of the apparatus.

In an embodiment, the received baseband signal vector includes a first sub-vector and a second sub-vector, the first sub-vector is generated from a first portion of the circularly polarized signal received by the horizontally polarized antenna, and the second sub-vector is generated from a second portion of the circular polarized signal received by the vertically polarized antenna.

In an embodiment, based on an eigenvector of an autocorrelation matrix of the received baseband signal vector, the receiving polarization vector of the transmitted baseband signal vector is estimated by the processing circuitry of the apparatus.

In an embodiment, the eigenvector is normalized by the processing circuitry of the apparatus as the receiving polarization vector.

In an embodiment, the transmitted baseband signal vector is a reference signal that is available to the apparatus, and based on a linear channel estimation, the receiving polarization vector is estimated by the processing circuitry of the apparatus.

In an embodiment, a respective effective receiving polarization vector for each of signal samples in the transmitted baseband signal vector is estimated by the processing circuitry of the apparatus. An average of the effective receiving polarization vectors is calculated by the processing circuitry of the apparatus as the estimated receiving polarization vector In an embodiment, the reference signal is one of a Zadoff-Chu sequence, a maximum length sequence, or a constant amplitude zero autocorrelation sequence.

In an embodiment, the reference signal is allocated at beginning of a radio subframe.

In an embodiment, the reference signal uses different code sequences when transmitted over different beams.

In an embodiment, the reference signal on one beam is a discrete Fourier transform (DFT) or an inverse DFT of the reference signal on another beam.

In an embodiment, based on the estimated receiving polarization vector, calibrated amplifier gains of the PAs and a calibrated phase difference between the LO signals of the frequency converters are determined by the processing circuitry of the apparatus. The PAs and a phase shifter are configured by the processing circuitry of the apparatus with the calibrated amplifier gains and the calibrated phase difference, respectively. The phase shifter generates a phase difference between the LO signals.

Aspects of the disclosure provide an apparatus for transmitting a circularly polarized signal by linearly polarized antennas. A horizontally polarized antenna and a vertically polarized antenna of the apparatus receive a first circularly polarized signal that is transmitted based on a transmitted baseband signal vector. An RF module of the apparatus generates a received baseband signal vector based on the received first circularly polarized signal. The received baseband signal vector includes a product of the transmitted baseband signal vector and a receiving polarization vector of the transmitted baseband signal vector. Processing circuitry of the apparatus estimates the receiving polarization vector of the transmitted baseband signal vector based on the received baseband signal vector. The processing circuitry calibrates PAs and LO signals of frequency converters in the RF module based on the estimated receiving polarization vector. The horizontally polarized antenna and the vertically polarized antenna transmit a second circularly polarized signal based on the calibrated PAs and the calibrated LO signals of the frequency converters in the RF module.

In an embodiment, the first baseband signal vector includes a first sub-vector and a second sub-vector, the first sub-vector is generated from a first portion of the circularly polarized signal received by the horizontally polarized antenna, and the second sub-vector is generated from a second portion of the circular polarized signal received by the vertically polarized antenna.

In an embodiment, the processing circuitry estimates the receiving polarization vector of the transmitted baseband signal vector based on an eigenvector of an autocorrelation matrix of the received baseband signal vector.

In an embodiment, the processing circuitry normalizes the eigenvector as the receiving polarization vector.

In an embodiment, the transmitted baseband signal vector is a reference signal that is available to the apparatus, and the processing circuitry estimates the receiving polarization vector based on a linear channel estimation.

In an embodiment, the processing circuitry estimates a respective effective receiving polarization vector for each of signal samples in the transmitted baseband signal vector. The processing circuitry calculates an average of the effective receiving polarization vectors as the estimated receiving polarization vector.

In an embodiment, the reference signal is one of a Zadoff-Chu sequence, a maximum length sequence, or a constant amplitude zero autocorrelation sequence.

In an embodiment, the reference signal is allocated at beginning of a radio subframe.

In an embodiment, the processing circuitry determines calibrated amplifier gains of the PAs and a calibrated phase difference between the local oscillator signals of the frequency converters based on the estimated receiving polarization vector. The processing circuitry configures the PAs and a phase shifter with the calibrated amplifier gains and the calibrated phase difference, respectively. The phase shifter generates a phase difference between the LO signals.

Aspects of the disclosure provide another method for transmitting a circularly polarized signal by linearly polarized antennas. Under the method, a transmitted baseband signal vector is generated by processing circuitry of an apparatus. Based on the transmitted baseband signal vector, transmitted radio frequency (RF) signals are generated by PAs of the apparatus. The transmitted RF signals are received by receiving circuitry of the apparatus to obtain a received baseband signal vector. Based on the received baseband signal vector, the PAs and local oscillator (LO) signals of frequency converters of the apparatus are calibrated. Based on the calibrated PAs and the calibrated LO signals, a circularly polarized signal is transmitted by a horizontally polarized antenna and a vertically polarized antenna of the apparatus.

In an embodiment, the received baseband signal vector includes a first sub-vector and a second sub-vector, the first sub-vector is generated based on a first transmitted RF signal of the transmitted RF signals output from a first PA of the PAs coupled to the horizontally polarized antenna, and the second sub-vector is generated based on a second transmitted RF signal of the transmitted RF signals output from a second PA of the PAs coupled to the vertically polarized antenna.

In an embodiment, an eigenvector of an autocorrelation matrix of the received baseband signal vector is calculated by the controller of the apparatus. Based on the eigenvector of the autocorrelation matrix of the received baseband signal vector, calibrated amplifier gains of the PAs and a calibrated phase difference between the LO signals of the frequency converters are determined by the controller of the apparatus. The PAs and a phase shifter are configured by the controller of the apparatus with the calibrated amplifier gains and the calibrated phase difference, respectively. The phase shifter generates a phase difference between the LO signals.

In an embodiment, the eigenvector includes a first sub-vector generated based on the first sub-vector of the received baseband signal vector and a second sub-vector generated based on the second sub-vector of the received baseband signal vector. Based on a length ratio of the first and second sub-vectors of the eigenvector, the calibrated amplifier gains are determined by the controller of the apparatus. Based on an angle difference of the first and second sub-vectors of the eigenvector, the calibrated phase difference between the LO signals is determined by the controller of the apparatus.

In an embodiment, the controller is included in the processing circuitry of the apparatus.

In an embodiment, the controller is outside the processing circuitry of the apparatus.

In an embodiment, the transmitted baseband signal vector is one of a Zadoff-Chu sequence, a maximum length sequence, or a constant amplitude zero autocorrelation sequence.

In an embodiment, the transmitted baseband signal vector is allocated at beginning of a radio subframe.

In an embodiment, the transmitted baseband signal vector uses different code sequences when transmitted over different beams.

In an embodiment, the transmitted baseband signal vector on one beam is a discrete Fourier transform (DFT) or an inverse DFT of the transmitted baseband signal vector on another beam.

Aspects of the disclosure provide another apparatus for transmitting a circularly polarized signal by linearly polarized antennas. Processing circuitry of the apparatus generates a transmitted baseband signal vector. PAs of the apparatus generate transmitted radio frequency (RF) signals based on the transmitted baseband signal vector. Receiving circuitry of the apparatus receive the transmitted RF signals to obtain a received baseband signal vector. A controller of the apparatus calibrates the PAs and LO signals of frequency converters of the apparatus based on the received baseband signal vector. A horizontally polarized antenna and a vertically polarized antenna of the apparatus transmit a circularly polarized signal based on the calibrated PAs and the calibrated LO signals.

In an embodiment, the received baseband signal vector includes a first sub-vector and a second sub-vector, the first sub-vector is generated based on a first transmitted RF signal of the transmitted RF signals output from a first PA of the PAs coupled to the horizontally polarized antenna, and the second sub-vector is generated based on a second transmitted RF signal of the transmitted RF signals output from a second PA of the PAs coupled to the vertically polarized antenna.

In an embodiment, the controller calculates an eigenvector of an autocorrelation matrix of the received baseband signal vector. The controller determines calibrated amplifier gains of the PAs and a calibrated phase difference between the LO signals of the frequency converters based on the eigenvector of the autocorrelation matrix of the received baseband signal vector. The controller configures the PAs and a phase shifter with the calibrated amplifier gains and the calibrated phase difference, respectively. The phase shifter generates a phase difference between the LO signals.

In an embodiment, the eigenvector includes a first sub-vector generated based on the first sub-vector of the received baseband signal vector and a second sub-vector generated based on the second sub-vector of the received baseband signal vector. The controller determines the calibrated amplifier gains based on a length ratio of the first and second sub-vectors of the eigenvector. The controller determines the calibrated phase difference between the LO signals based on an angle difference of the first and second sub-vectors of the eigenvector.

In an embodiment, the controller is included in the processing circuitry.

In an embodiment, the controller is outside the processing circuitry.

In an embodiment, the transmitted baseband signal vector is one of a Zadoff-Chu sequence, a maximum length sequence, or a constant amplitude zero autocorrelation sequence.

In an embodiment, the transmitted baseband signal vector is allocated at beginning of a radio subframe.

In an embodiment, the transmitted baseband signal vector uses different code sequences when transmitted over different beams.

In an embodiment, the transmitted baseband signal vector on one beam is a discrete Fourier transform (DFT) or an inverse DFT of the transmitted baseband signal vector on another beam.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

System Architecture

Figure 1:
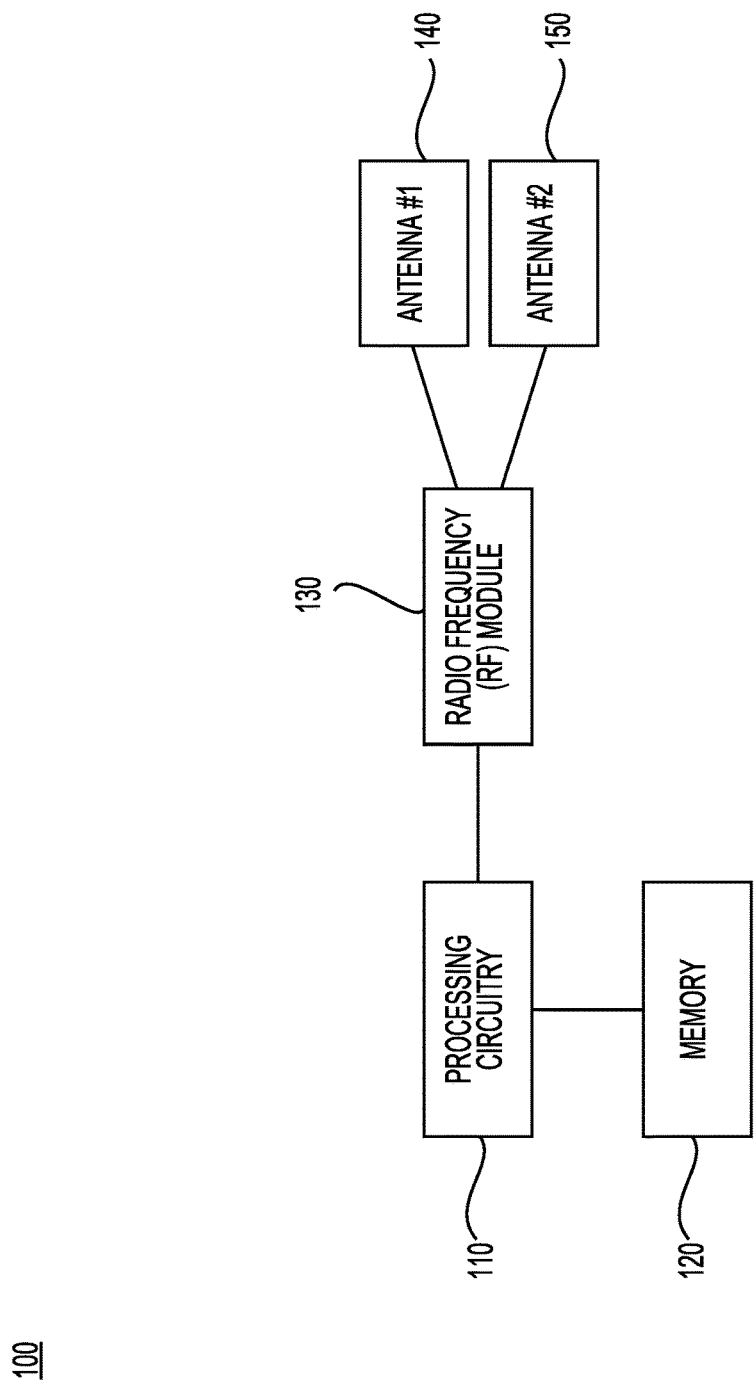
FIG. 1 shows an exemplary apparatus according to embodiments of the disclosure.

FIG. 1 shows an exemplary apparatus 100 according to embodiments of the disclosure. The apparatus 100 can be configured to perform various functions in accordance with one or more embodiments or examples described herein. Thus, the apparatus 100 can provide means for implementation of techniques, processes, functions, components, systems described herein. For example, the apparatus 100 can be used to implement functions of a user equipment (UE) (e.g., a mobile terminal) or a base station (BS) (e.g., a gNB) in various embodiments and examples described herein. The apparatus 100 can include a general-purpose processor or specially designed circuits to implement various functions, components, or processes described herein in various embodiments. The apparatus 100 can include processing circuitry (or baseband processing circuitry) 110, a memory 120, and a radio frequency (RF) module 130, and two antennas 140 and 150. It is noted that a number of the circuit blocks in the apparatus 100 is not limited in this disclosure. For example, the apparatus 100 can include more than two antennas and/or more than one RF module.

In various examples, the processing circuitry 110 can include circuitry configured to perform the functions and processes described herein in combination with software or without software. In various examples, the processing circuitry 110 can be a digital signal processor (DSP), an application specific integrated circuit (ASIC), programmable logic devices (PLDs), field programmable gate arrays (FPGAs), digitally enhanced circuits, or comparable device or a combination thereof.

In some other examples, the processing circuitry 110 can be a central processing unit (CPU) configured to execute program instructions to perform various functions and processes described herein. Accordingly, the memory 120 can be configured to store program instructions. The processing circuitry 110, when executing the program instructions, can perform the functions and processes. The memory 120 can further store other programs or data, such as operating systems, application programs, and the like. The memory 120 can include a read only memory (ROM), a random-access memory (RAM), a flash memory, a solid state memory, a hard disk drive, an optical disk drive, and the like.

The RF module 130 receives a processed data signal from the processing circuitry 110 and converts the data signal to beamforming wireless signals that are then transmitted via the antennas 140 and/or 150, or vice versa. The RF module 130 can include digital to analog convertors (DAC), analog to digital converters (ADC), frequency up convertors, frequency down converters, filters, and duplexers for reception and transmission operations. The ANTENNA #1 module 140 and ANTENNA #2 module 150 can include multi-antenna circuitry for beamforming operations. For example, the multi-antenna circuitry can include an uplink spatial filter circuit, and a downlink spatial filter circuit for shifting analog signal phases or scaling analog signal amplitudes.

The apparatus 100 can optionally include other components, such as input and output devices, additional or signal processing circuitry, and the like. Accordingly, the apparatus 100 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid-state memory, magnetic tape, a removable computer diskette, a random-access memory (RAM), a read-only memory (ROM), a magnetic disk and an optical disk, and the like. The computer-readable non-transitory storage medium can include all types of computer readable medium, including magnetic storage medium, optical storage medium, flash medium, and solid-state storage medium.

It is understood that the specific order or hierarchy of blocks in the processes and/or flowcharts disclosed is an illustration of exemplary approaches. Based upon design preferences, it is understood that the specific order or hierarchy of blocks in the processes and/or flowcharts may be rearranged. Further, some blocks may be combined or omitted. The accompanying method claims present elements of the various blocks in a sample order and are not meant to be limited to the specific order or hierarchy presented.

Figure 2:
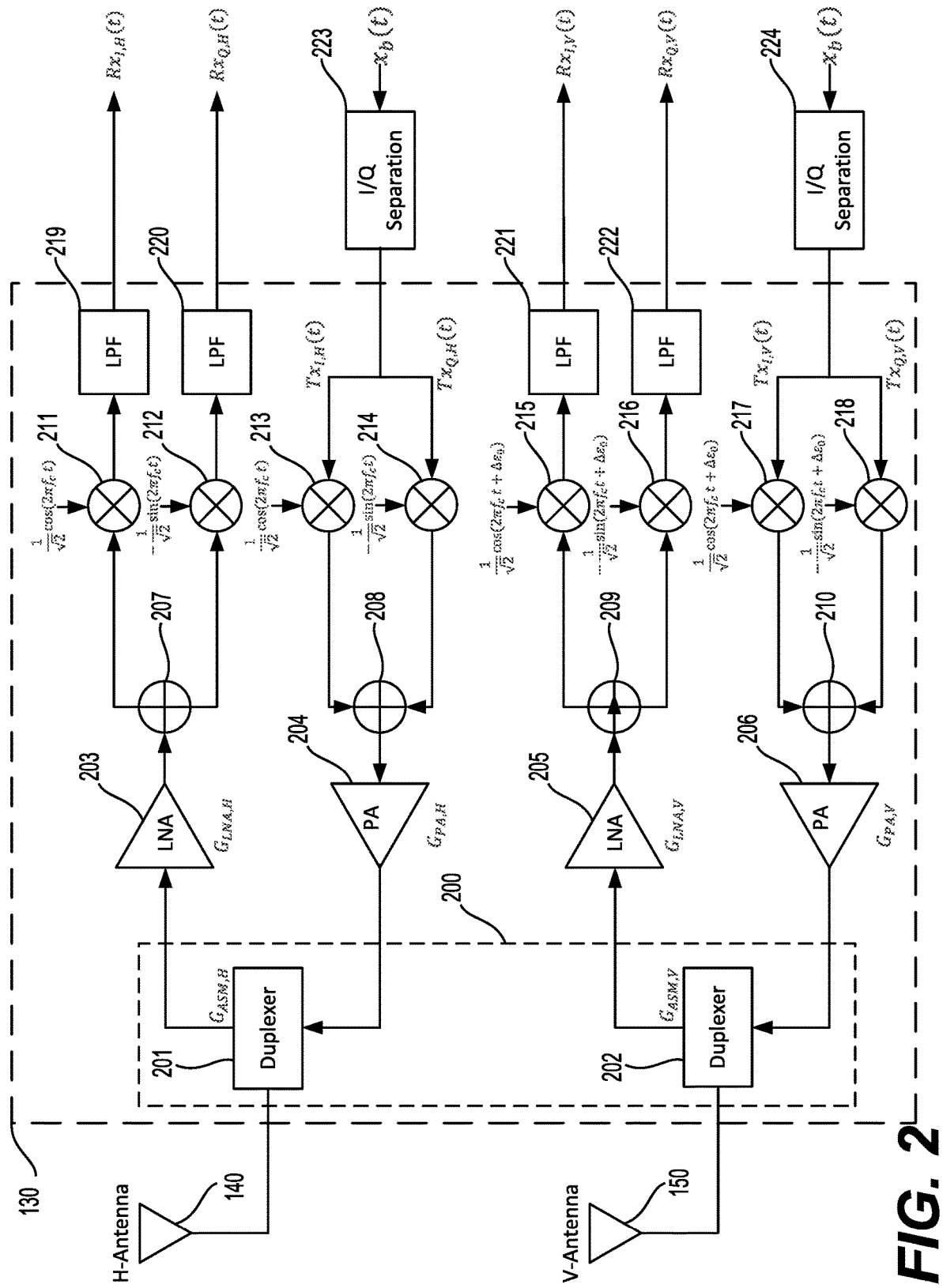
FIG. 2 shows an exemplary antenna architecture of the apparatus according to embodiments of the disclosure.

FIG. 2 shows an exemplary antenna architecture of the apparatus 100 according to embodiments of the disclosure. The antennas 140 and 150 of the apparatus 100 are horizontally polarized H-Antenna and vertically polarized V-Antenna, respectively. The H-Antenna 140 and the V-Antenna 150 are placed orthogonally to each other. That is, a cross angle of placements of the H-Antenna 140 and the V-Antenna 150 is 90°. Each antenna is coupled to a respective receiving path and a respective transmitting path in the RF module 130. Through the receiving path, a RF signal received by an antenna can be converted into a received baseband signal, which is further input to the baseband processing circuitry 110 for digital processing. Through the transmitting path, a transmitted baseband signal that is output from the baseband processing circuitry 110 can be converted into a RF signal, which is further transmitted by the antenna. Since the signal processing through the receiving paths (or transmitting paths) are similar to each other, only the receiving and transmitting paths coupled to the H-Antenna 140 will be described in details.

As shown in FIG. 2, the receiving and transmitting paths coupled to the H-Antenna 140 are coupled to the H-Antenna 140 through a duplexer 201, the receiving and transmitting paths coupled to the V-Antenna 150 are coupled to the V-Antenna 150 through a duplexer 202, and the duplexers 201 and 202 are included in an antenna switching module (ASM) 200 of the RF module 130. Thus, configured gains of the duplexers 201 and 202 are represented as $G_{ASM,H}$ and $G_{ASM,V}$, respectively.

The receiving path includes a low noise amplifier (LNA) 203, a signal divider 207, an I-path frequency down converter 211, a Q-path frequency down converter 212, an I-path low pass filter (LPF) 219, and a Q-path LPF 220. A RF signal with a carrier frequency $f_c$ received by the H-Antenna 140 is passed through the duplexer 201 to the LNA 203. The received signal output from the duplexer 201 is amplified through the LNA 203 as an amplified received signal. A configured gain of the LNA 203 is represented as $G_{LNA,H}$. The amplified received signal is divided by the signal divider 207 into an I-path received signal and a Q-path received signal. The I-path and Q-path received signals are down converted by the frequency down converters 211 and 212 as I-path and Q-path down-converted received signals, respectively. Local oscillator (LO) signals of the frequency down converters 211 and 212 can be represented as $$\frac{1}{\sqrt{2}} \cos (2\pi f_c t) \text{ and } -\frac{1}{\sqrt{2}} \sin (2\pi f_c t),$$

respectively. The I-path and Q-path down-converted received signals are then filtered by the LPFs 219 and 220 as I-path and Q-path received baseband signals $Rx_{I,H}(t)$ and $Rx_{Q,H}(t)$, respectively. The I-path and Q-path received baseband signals $Rx_{I,H}(t)$ and $Rx_{Q,H}(t)$ can be input to the baseband processing circuitry 110 of the apparatus 100 for digital processing.

The transmitting path includes a power amplifier (PA) 204, a summing amplifier 208, an I-path frequency up converter 213, and a Q-path frequency up converter 214. In the transmitting path, a transmitted baseband signal $x_b(t)$ can be split by an I/Q separation module 223 of the baseband processing circuitry 110 into an I-path transmitted baseband signal $Tx_{I,H}(t)$ and a Q-path transmitted baseband signal $Tx_{Q,H}(t)$. The I-path and Q-path transmitted baseband signals $Tx_{I,H}(t)$ and $Tx_{Q,H}(t)$ are up converted by the frequency up converters 213 and 214 as I-path and Q-path up-converted transmitted signals, respectively. Local oscillator (LO) signals of the frequency up converters 213 and 214 can be represented as $$\frac{1}{\sqrt{2}} \cos (2\pi f_c t) \text{ and } -\frac{1}{\sqrt{2}} \sin(2\pi f_c t),$$

respectively. The I-path and Q-path up-converted transmitted signals are summed by the summing amplifier 208 as a summed transmitted signal. The summed transmitted signal is amplified by the PA 204 as an amplified transmitted signal. A configured gain of the PA 204 is represented as $G_{PA,H}$. The amplified transmitted signal is passed through the duplexer 201 to the H-Antenna 140. The transmitted signal output from the duplexer 201 is transmitted via the H-Antenna 140.

The receiving and transmitting paths coupled to the V-Antenna 150 are similar to the receiving and transmitting paths coupled to the H-Antenna 140, respectively, and thus are not further described. It is noted that there can be a phase difference between the LO signals of the frequency converters in the receiving path (or transmitting path) coupled to the H-Antenna 140 and V-Antenna 150. For example, the LO signals of the frequency converters 211 and 215 are $$\frac{1}{\sqrt{2}} \cos (2\pi f_c t) \text{ and } \frac{1}{\sqrt{2}} \cos (2\pi f_c t + \Delta\varepsilon_0),$$

respectively. The phase difference $\Delta\varepsilon_0$ can be due to a phase shifter (not shown in FIG. 2) coupled between the frequency converters and an LO generating the LO signals.

Polarization Loss

As described above, the antennas 140 and 150 of the apparatus 100 are linearly polarized, and thus a polarization loss (e.g., 3 dB) can occur when the apparatus 100 receives a circularly polarized signal with the linearly polarized antennas 140 and 150.

Considering a transmitted baseband signal $x_b(t)$ with an expected power $E(|x_b(t)|^2)=P_0$, a corresponding circularly polarized signal $s(t) \in \mathbb{C}^2$ ($\mathbb{C}^2$ represents all pairs of complex numbers) moving along Z-axis with a carrier frequency $f_c$ can be expressed as $$s(t) = A_0 x_b(t) e^{j2\pi f_c t} \frac{1}{\sqrt{2}} \begin{pmatrix} 1 \\ \pm j \end{pmatrix},$$

where 1 and ±j correspond to X-axis and Y-axis, and $A_0$ represents an amplitude of the signal s(t). A transmitted power of the circularly polarized signal s(t) can be expressed as $P_{Tx}=E(|s(t)|^2)=A_0^2 P_0$.

If the circularly polarized signal s(t) is received by a linearly polarized antenna with a slant angle θ, then a corresponding received baseband signal r(t) can be expressed as $$r(t) = (\cos\theta, \sin\theta)e^{-j2\pi f_c t} s(t) = A_0 x_b(t) \frac{1}{\sqrt{2}} e \pm j\theta,$$

and a received power of the received baseband signal r(t) can be expressed as $$P_{Rx} = E(|r(t)|^2) = A_0^2 \frac{1}{2} E(|X_b(t)|^2) = A_0^2 \frac{P_0}{2} = \frac{P_{Tx}}{2}.$$

It can be seen that the received power is a half of the transmitted power. That is, there is a 3 dB polarization loss when a circularly polarized signal is received by a linearly polarized antenna. Similarly, there is a 3 dB polarization loss when a linearly polarized signal is received by a circularly polarized antenna.

Accordingly, in order to minimize the polarization loss, this disclosure provides methods and embodiments, in which the apparatus 100 is able to transmit and/or receive circularly polarized signals by the linearly polarized antennas without incurring the polarization loss.

Receiving Circularly Polarized Signals with Linearly Polarized Antennas

According to embodiments of the disclosure, a transmitted signal s(t) with a polarization $\psi_0$, which is generated based on a transmitted baseband signal $x_b(t)$ and is transmitted through a communication channel with a channel response $H_0$, can be received by the linearly polarized antennas 140 and 150 of the apparatus 100. The received signal $H_0 \psi_0 s(t)$ can be processed through the receiving paths coupled to the H-Antenna 140 and V-Antenna 150 in the RF module 130, respectively, and two received baseband signals $Rx_{I,H}(t)$ and $Rx_{Q,H}(t)$ can be obtained. After combining $Rx_{I,H}(t)$ and $Rx_{Q,H}(t)$, a combined received baseband signal r(t) can be obtained as $$r(t) = H_0 G_{ASM} G_{LNA} \begin{pmatrix} 1 & 0 \\ 0 & e^{j\Delta\varepsilon_r} \end{pmatrix} \psi_0 x_b(t) + w,$$

where $G_{ASM} \triangleq \begin{pmatrix} G_{ASM,H} & 0 \\ 0 & G_{ASM,V} \end{pmatrix}$ represents the configured gains of the duplexers 201 and 202 in the RF module 130, $$G_{LNA} \triangleq \begin{pmatrix} G_{LNA,H} & 0 \\ 0 & G_{LNA,V} \end{pmatrix}$$

represents the configured gains of the LNAs 203 and 205 in the RF module 130, and $\Delta\varepsilon_r = \Delta\varepsilon_0 + \Delta\varepsilon_{e1}$ represents a phase difference between the receiving paths coupled to the H-Antenna 140 and V-Antenna 150, where $\Delta\varepsilon_0$ and $\varepsilon_{e1}$ are a phase configuration difference (e.g., the phase difference $\Delta\varepsilon_0$ between the LO signals of the frequency down converters 211 and 215) and a phase noise difference between the receiving paths coupled to the H-Antenna 140 and V-Antenna 150, respectively. In addition, $w_n$ is additive white Gaussian noise (AWGN).

The combined received baseband signal r(t) can be expressed in a discrete form as $$r_n = H_0 G_{ASM} G_{LNA} \begin{pmatrix} 1 & 0 \\ 0 & e^{j\Delta\varepsilon_r} \end{pmatrix} \psi_0 x_b(n\Delta T_s) + w_n,$$

where $x_b(n\Delta T_s)$ represents the transmitted baseband signal at the $n_{th}$ sample. The combined received discrete baseband signal $r_n$ can be input to the baseband processing circuitry 110 of the apparatus 100 for digital processing.

As described above, the polarization loss can occur for the combined received discrete baseband signal $r_n$. In order to minimize the polarization loss, the signal-to-noise ratio (SNR) of the combined received discrete baseband signal $r_n$ needs to be maximized. If a receiving polarization vector is defined as $$\psi_r = H_0 G_{ASM} G_{LNA} \begin{pmatrix} 1 & 0 \\ 0 & e^{j\Delta\varepsilon_r} \end{pmatrix} \psi_0,$$

the combined received baseband signal can be expressed as $r_n = \psi_r x_b(n\Delta T_s) + w_n$. The receiving polarization vector $\psi_r$ needs to be estimated to maximize the SNR of the combined received discrete baseband signal $r_n$. The following embodiments provide methods for the apparatus 100 to estimate the receiving polarization vector $\psi_r$ for minimizing the polarization loss, and the estimated receiving polarization vector can be represented as $\hat{\psi}_r$.

Embodiment I

In embodiment I, a reference signal or a synchronization signal from a network can be used for the estimation of the receiving polarization vector $\psi_r$. The reference signal or the synchronization signal should be known to the apparatus 100. Thus, a channel estimation can be used for obtaining the estimated receiving polarization vector $\hat{\psi}_r$. For example, if the transmitted baseband signal $x_b(t)$ is the reference signal or the synchronization signal that is available to the apparatus 100, the estimated receiving polarization vector $\hat{\psi}_r$ can be obtained through a linear channel estimation as $$\hat{\psi}_r = \frac{1}{N} \sum_{n=0}^{N-1} \frac{r_n}{x_b(n\Delta T_s)}.$$

Embodiment II

In embodiment II, the apparatus 100 starts accessing a network, and thus a reference signal or a synchronization signal from the network may not be known to the apparatus 100. That is, the transmitted baseband signal $x_b(t)$ is not available to the apparatus 100. In such an embodiment, an autocorrelation matrix $\hat{R}$ of the combined received discrete baseband signal $r_n$ can be estimated as $$\hat{R} = \frac{1}{N}\sum r_n r_n^H,$$

where $r_n^H$ is a Hermitian transposed vector of $r_n$, and N is a number of samples in the combined received discrete baseband signal $r_n$. For example, N is a number of latest samples collected by the apparatus 100. Then, an eigenvector of the autocorrelation matrix $\hat{R}$ can be calculated as $$v = \begin{pmatrix} v_H \\ v_V \end{pmatrix},$$

where $v_H$ and $v_V$ represent the eigenvectors corresponding to the H-Antenna 140 and V-Antenna 150, respectively. Then, by normalizing the eigenvector $v$, the estimated receiving polarization vector $\hat{\psi}_r$ can be derived as $$\hat{\psi}_r = \begin{pmatrix} \hat{\psi}_{r,H} \\ \hat{\psi}_{r,V} \end{pmatrix} = \frac{v}{|v|},$$

where $\hat{\psi}_{r,H}$ and $\hat{\psi}_{r,V}$ represent the estimated receiving polarization vectors corresponding to the H-Antenna 140 and V-Antenna 150, respectively.

In the above embodiments I and II, after the estimated receiving polarization vector $\hat{\psi}_r$ is obtained, an improved combined received discrete baseband signal can be derived as $$r_{combined} = \frac{\hat{\psi}_r^H}{|\hat{\psi}_r|} r_n,$$

where $\hat{\psi}_r^H$ is a Hermitian transposed vector of $\hat{\psi}_r$, and $|\hat{\psi}_r|$ is a length of $\hat{\psi}_r$. Compared to $r_n$, the polarization loss can be minimized for the improved combined received discrete baseband signal $r_{combined}$.

Transmitting Circularly Polarized Signals with Linearly Polarized Antennas

According to embodiments of the disclosure, a transmitted RF signal that is output from the ASM 200 and input to the linearly polarized antennas 140 and 150 can be expressed as $$s(t) = G_{ASM} G_{PA} \begin{pmatrix} 1 \\ e^{j\Delta\varepsilon_t} \end{pmatrix} x_b(t) e^{j2\pi f_c t}, \text{ where } G_{ASM} \triangleq \begin{pmatrix} G_{ASM,H} & 0 \\ 0 & G_{ASM,V} \end{pmatrix}$$

represents the configured gains of the duplexers 201 and 202 in the RF module 130, $$G_{PA} \triangleq \begin{pmatrix} G_{PA,H} & 0 \\ 0 & G_{PA,V} \end{pmatrix}$$

represents the configured gains of the PAs 204 and 206 in the RF module 130, $x_b(t)$ is a transmitted baseband signal of the transmitted RF signal s(t), $f_c$ is a carrier frequency of the transmitted RF signal s(t), and $\Delta\varepsilon_t = \Delta\varepsilon_0 + \Delta\varepsilon_{e2}$ represents a phase difference between the transmitting paths coupled to the H-Antenna 140 and V-Antenna 150, where $\Delta\varepsilon_0$ and $\varepsilon_{e2}$ are a phase configuration difference (e.g., the phase difference $\Delta\varepsilon_0$ between the LO signals of the frequency up converters 213 and 217) and a phase noise difference between the transmitting paths coupled to the H-Antenna 140 and V-Antenna 150, respectively.

As described above, if a linearly polarized signal transmitted from the linearly polarized antennas 140 and 150 is received by a circularly polarized antenna of a receiver, a polarization loss can occur to the signal reception of the receiver. Accordingly, to minimize the polarization loss, the apparatus 100 should be capable of transmitting a circularly polarized signal by the linearly polarized antennas 140 and 150. That is, the transmitted RF signal s(t) should be a circularly polarized signal. If a transmitting polarization vector is defined as $$\psi_t = G_{ASM} G_{PA} \begin{pmatrix} 1 \\ e^{j\Delta\varepsilon_t} \end{pmatrix},$$

the transmitted RF signal s(t) can be expressed as $s(t) = \psi_t x_b(t) e^{j2\pi f_c t}$.

To transmit a circular polarized signal by the linearly polarized antennas 140 and 150, the following conditions should be satisfied: (1) amplitudes of signal waves at the antennas 140 and 150 should be equivalent; (2) a phase difference of the signal waves at the antennas 140 and 150 should be $$\pm\frac{\pi}{2}\left(RHCP: +\frac{\pi}{2}; LHCP: -\frac{\pi}{2}\right);$$

and (3) a cross angle of the placements of the antennas 140 and 150 should be $$\frac{\pi}{2}.$$

Accordingly, $|G_{ASM,H}|*|G_{PA,H}|=|G_{ASM,V}|*|G_{PA,V}|$, and $$\Delta\varepsilon_0 + \angle G_{ASM,V} G^*_{ASM,H} = \pm\frac{\pi}{2}, \text{ where } \angle G_{ASM,V} G^*_{ASM,H}$$

represents an angle between $G_{ASM,V}$ and $G_{ASM,H}$. To satisfy the above conditions, the apparatus 100 needs to calibrate $G_{PA}$ and $\Delta\varepsilon_0$.

Embodiment III

In embodiment III, a reference signal or a synchronization signal from a network is known to the apparatus 100, and the channel response $H_0$ of the network and the polarization vector $\psi_0$ of the reference signal or synchronization signal can be obtained by the apparatus 100. In addition, the configured gains $G_{LNA,H}$ and $G_{LNA,H}$ of the LNAs 203 and 205 are also known to the apparatus 100. Accordingly, after the estimated receiving polarization vector $$\hat{\psi}_r = \begin{pmatrix} \hat{\psi}_{r,H} \\ \hat{\psi}_{r,V} \end{pmatrix} = H_0 G_{ASM} G_{LNA} \begin{pmatrix} 1 & 0 \\ 0 & e^{j\Delta\varepsilon_r} \end{pmatrix} \psi_0$$

is obtained by the apparatus 100, the configured gains of the duplexers 201 and 202 can be derived as $$G_{ASM,H} = \frac{\hat{\psi}_{r,H}}{H_0 G_{LNA,H} \psi_0} \text{ and } G_{ASM,V} = \frac{\hat{\psi}_{r,V}}{H_0 G_{LNA,V} \psi_0},$$

respectively. Then, an calibrated phase difference $\Delta\varepsilon'_0$ and two calibrated PA gains $G'_{PA,H}$ and $G'_{PA,V}$ can be obtained as follows:

$$\Delta\varepsilon'_0 = \left(\pm\frac{\pi}{2} - \angle G_{ASM,V} G^*_{ASM,H}\right), G'_{PA,H} = \frac{G_0 \delta}{\sqrt{1+\delta^2}}, G'_{PA,V} = \frac{G_0}{\sqrt{1+\delta^2}},$$

where $\angle G_{ASM,V} G^*_{ASM,H}$ represents an angle between $G_{ASM,V}$ and $G_{ASM,H}$, $\delta=|G_{ASM,V}|/|G_{ASM,H}|$, and $G_0$ is a common power amplifier gain for both PAs 204 and 206. The calibrated phase difference $\Delta\varepsilon'_0$ and calibrated PA gains $G'_{PA,H}$ and $G'_{PA,V}$ can be configured to the RF module 130 of the apparatus 100 as $G_{PA,H}=G'_{PA,H}$, $G_{PA,V}=G'_{PA,V}$, and $\Delta\varepsilon_0=\Delta\varepsilon'_0$.

Embodiment IV

Figure 3:
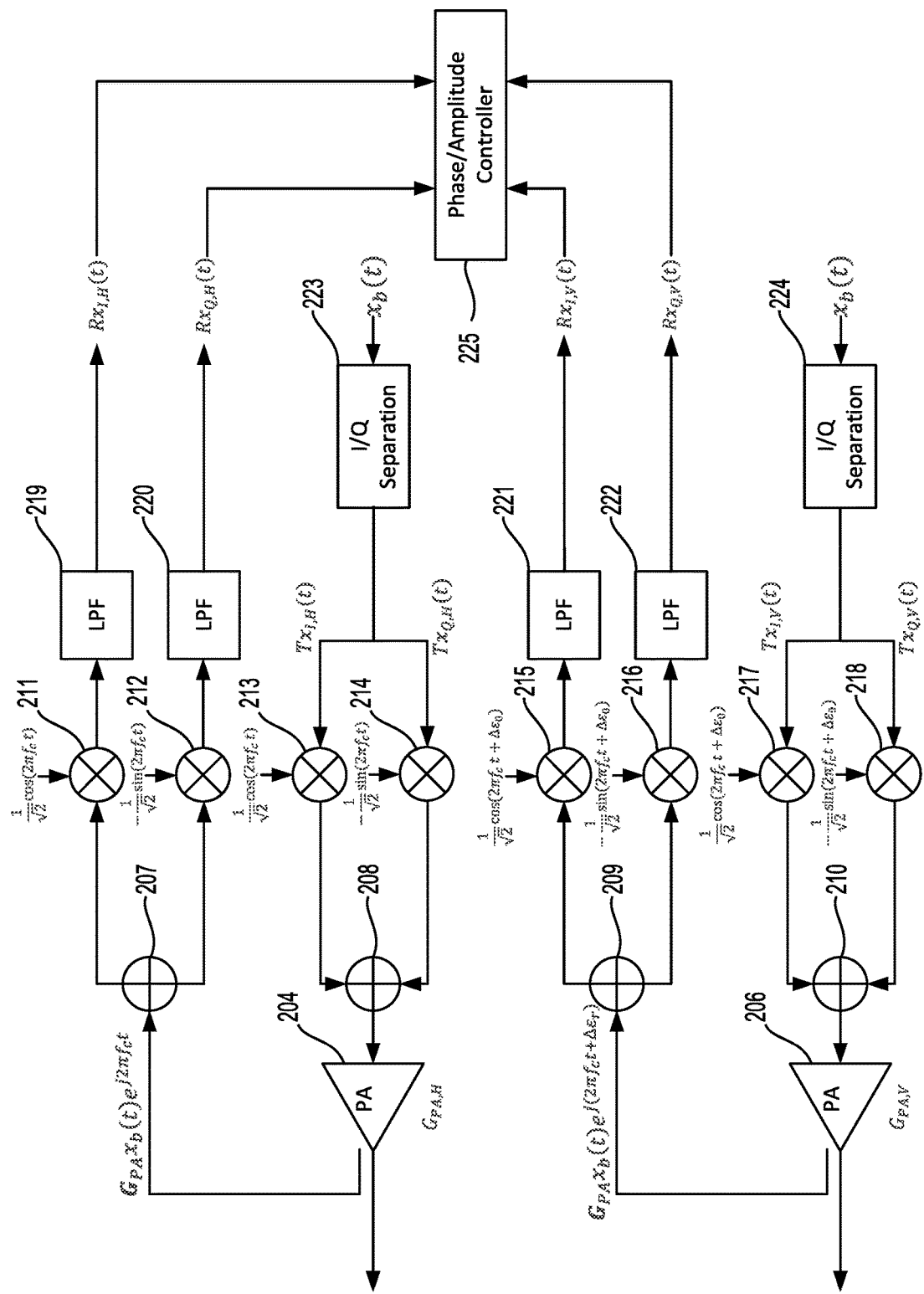
FIG. 3 shows an exemplary feedback architecture of the apparatus according to embodiments of the disclosure.

In embodiment IV, a transmitted signal $$s(t) = G_{PA}\begin{pmatrix}1\\e^{j\Delta\varepsilon_t}\end{pmatrix} x_b(t) e^{j2\pi f_c t}$$

output from the PAs 204 and 206 can be feedback to the signal dividers 207 and 209 to obtain the calibrated the PA gains $G'_{PA,H}$ and $G'_{PA,V}$ and the calibrated phase difference $\Delta\varepsilon'_0$. As shown in FIG. 3, the transmitted signals $G_{PA} x_b(t) e^{j2\pi f_c t}$ and $G_{PA} x_b(t) e^{j(2\pi f_c t+\Delta\varepsilon_t)}$ are feedback to the signal dividers 207 and 209, respectively. Each transmitted signal is further divided by the respective signal divider into I/Q signals, which are input through the LPFs to a controller 225. In an example, the controller 225 can be included in the baseband processing circuitry 110. In an example, the controller 225 can be outside of the baseband processing circuitry 110. The controller 225 can derive the calibrated the PA gains $G'_{PA,H}$ and $G'_{PA,V}$ and the calibrated phase difference $\Delta\varepsilon'_0$ based on the output baseband signals $Rx_{I,H}(t)$, $Rx_{Q,H}(t)$, $Rx_{I,V}(t)$, and $Rx_{Q,V}(t)$ from the LPFs 219-222. In such an embodiment, a discrete baseband signal received by the controller 225 can be expressed as $$r_n = G_{PA}\begin{pmatrix}1\\e^{j\Delta\varepsilon_t}\end{pmatrix} x_b(n\Delta T_s).$$

First, an estimated autocorrelation matrix of the received discrete baseband signal is calculated as $$\hat{R} = \frac{1}{N}\sum r_n r_n^H,$$

where N is a number of latest samples collected by the controller 225, and $r_n^H$ is a Hermitian transposed vector of $r_n$. Then, an eigenvector of the autocorrelation matrix is calculated as $$v = \begin{pmatrix}v_H\\v_V\end{pmatrix}$$

of $\hat{R}$. Based on the eigenvector v, the calibrated phase difference $\Delta\varepsilon'_0$ and calibrated the PA gains $G'_{PA,H}$ and $G'_{PA,V}$ can be derived as follows:

$$\Delta\varepsilon'_0 = \Delta\varepsilon_0 + \left(\pm\frac{\pi}{2} - \angle v_V v_H^*\right), G'_{PA,H} = \frac{G_{PA,H}(1+\delta)}{2}, G'_{PA,V} = \frac{G_{PA,V}\left(1+\frac{1}{\delta}\right)}{2},$$

where $\angle v_V v_H^*$ represents an angle between $v_V$ and $v_H$, and $\delta=|v_V|/|v_H|$. The calibrated phase difference $\Delta\varepsilon'_0$ and calibrated PA gains $G'_{PA,H}$ and $G'_{PA,V}$ can be configured to the RF module 130 of the apparatus 100 as $G_{PA,H}=G'_{PA,H}$, $G_{PA,V}=G'_{PA,V}$, and $\Delta\varepsilon_0=\Delta\varepsilon'_0$.

Reference Signal Design

As described above, a reference signal or a synchronization signal can be used for the estimation of the receiving polarization vector in embodiment I and/or the calibration of the PAs and the phase difference in embodiment III.

In an embodiment, the reference signal can be a demodulation reference signal (DMRS) for physical downlink control channel (PDCCH) or physical downlink shared channel (PDSCH).

In an embodiment, the synchronization signal can be a synchronization signal block (SSB).

Figure 4:
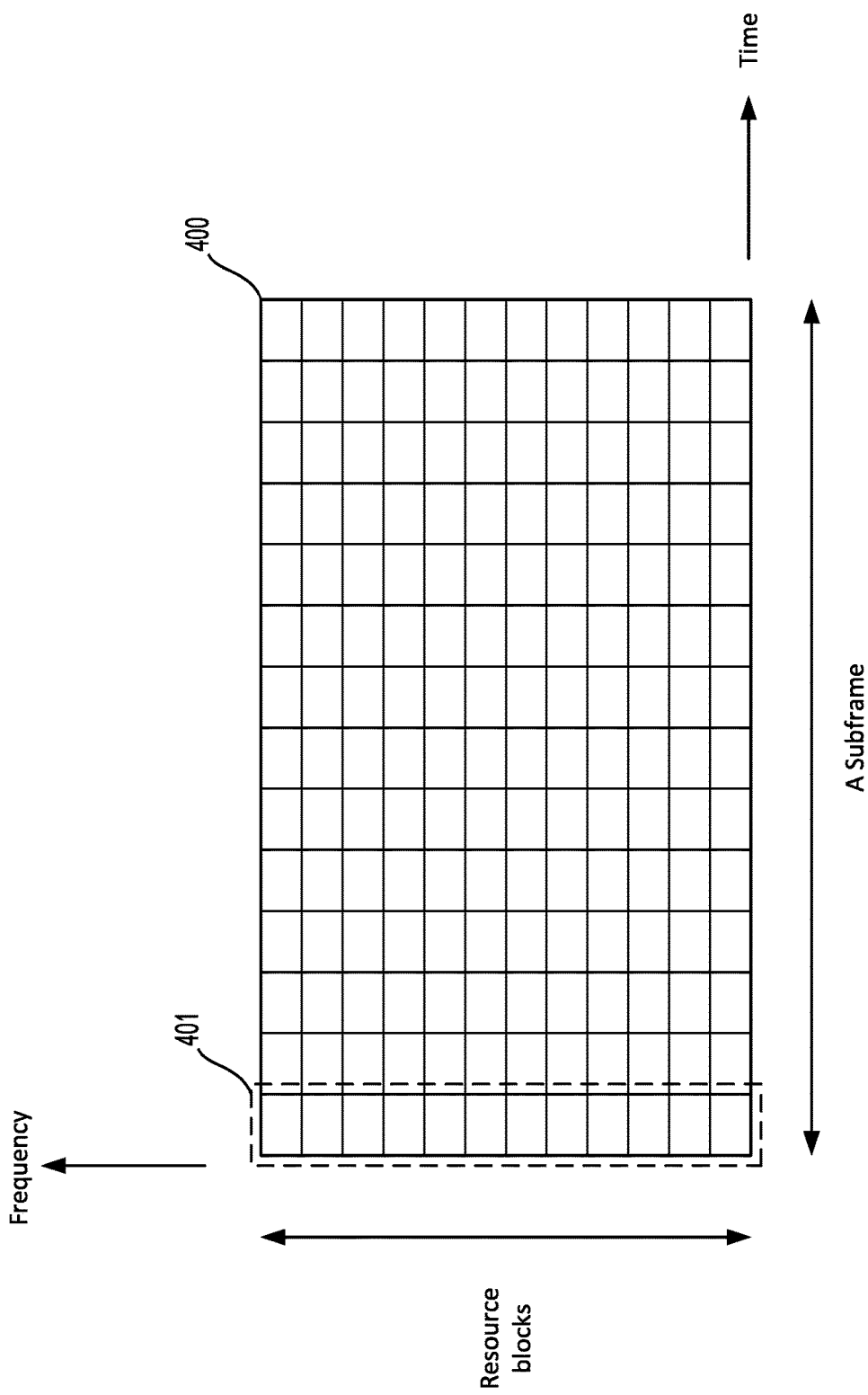
FIG. 4 shows an exemplary reference signal design according to embodiments of the disclosure.

FIG. 4 shows an exemplary reference signal design according to embodiments of the disclosure. In the resource grid 400, a symbol 401 at the beginning of a radio subframe can be used as a reference signal for the estimation of the receiving polarization vector in embodiment I and/or the calibration of the PAs and the phase difference in embodiment III. The reference signal at the symbol 401 can be a constant amplitude zero autocorrelation sequence (CAZAC). The radio subframe can be a downlink subframe, the remaining symbols in the resource grid 400 can be used for PDSCH/PDCCH, and rate matching of PDSCH/PDCCH should bypass the reference signal at the symbol 401.

It is noted that the symbol 401 can also be used as the transmitted signal $r_n$ that is feedback to the controller 225 for the calibration of the PAs and the phase difference in embodiment IV. In such a case, the radio subframe can be an uplink subframe, the remaining symbols in the resource grid 400 can be used for PUSCH/PUCCH, and rate matching of PUSCH/PUCCH should bypass the transmitted signal at the symbol 401.

Figure 5:
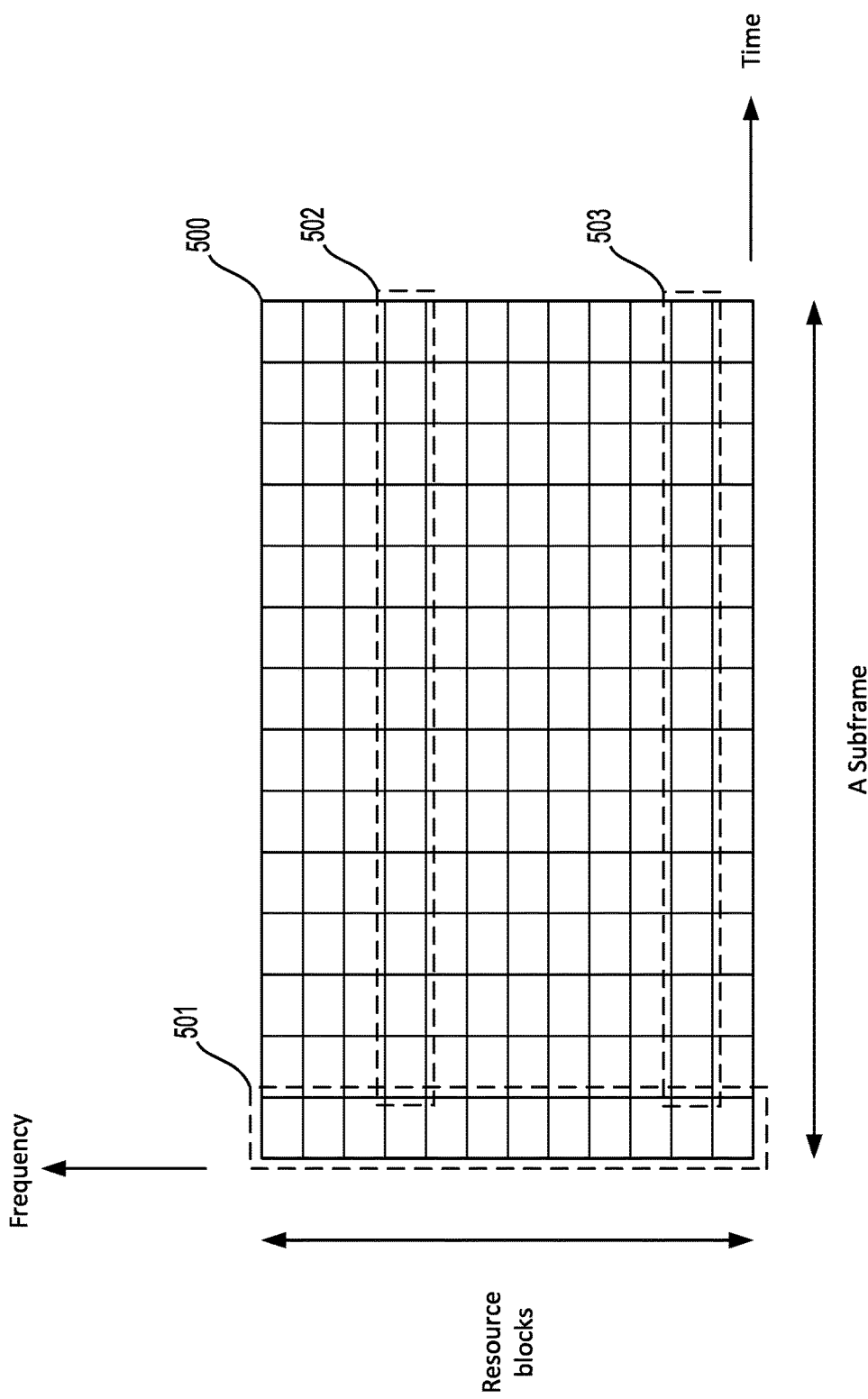
FIG. 5 shows an exemplary demodulation reference signal (DMRS) for physical downlink control channel (PDCCH) or physical downlink shared channel (PDSCH) in a non-terrestrial network (NTN) according to embodiments of the disclosure.

FIG. 5 shows an exemplary DMRS for PDCCH/PDSCH in a non-terrestrial network (NTN) according to embodiments of the disclosure. In the resource grid 500, a DMRS is allocated across time domain. That is, for a given subcarrier, a resource element is skipped if the resource element is reserved for a reference signal that is used for the estimation of the receiving polarization vector in embodiment I and/or the calibration of the PAs and the phase difference in embodiment III, and a DMRS can occupy all the remaining symbols of a slot.

For example, in the resource grid 500, a symbol 501 at the beginning of a radio subframe is used as a reference signal for the estimation of the receiving polarization vector in embodiment I and/or the calibration of the PAs and the phase difference in embodiment III. A DMRS for PDCCH/PDSCH in NTN can be represented by 502 or 503.

Figure 6:
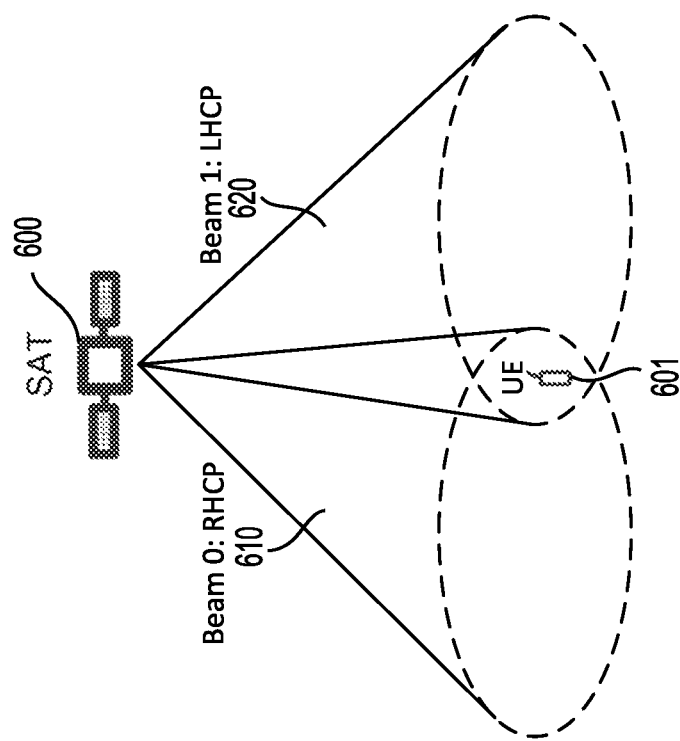
FIG. 6 an exemplary synchronization signal design according to embodiments of the disclosure.

FIG. 6 shows an exemplary synchronization signal design according to embodiments of the disclosure. In FIG. 6, a satellite 600 can communicate with a user equipment (UE) 601 through two adjacent beams 610 and 620. In order to minimize the cross interference, one beam can be RHCP and the other can be LHCP. For example, the beam 610 is RHCP and the beam 620 is LHCP. The synchronization signals on the two adjacent beams 610 and 620 can be orthogonal in the code domain. For example, a primary synchronization signal (PSS) (or a secondary synchronization signal (SSS)) on one beam can be a discrete Fourier transform (DFT) or an inverse DFT of a PSS (or SSS) on the other beam. In an example, each PSS (or SSS) can be a Zadoff-Chu sequence, a maximum length sequence, or a constant amplitude zero autocorrelation sequence.

Flowcharts

Figure 7:
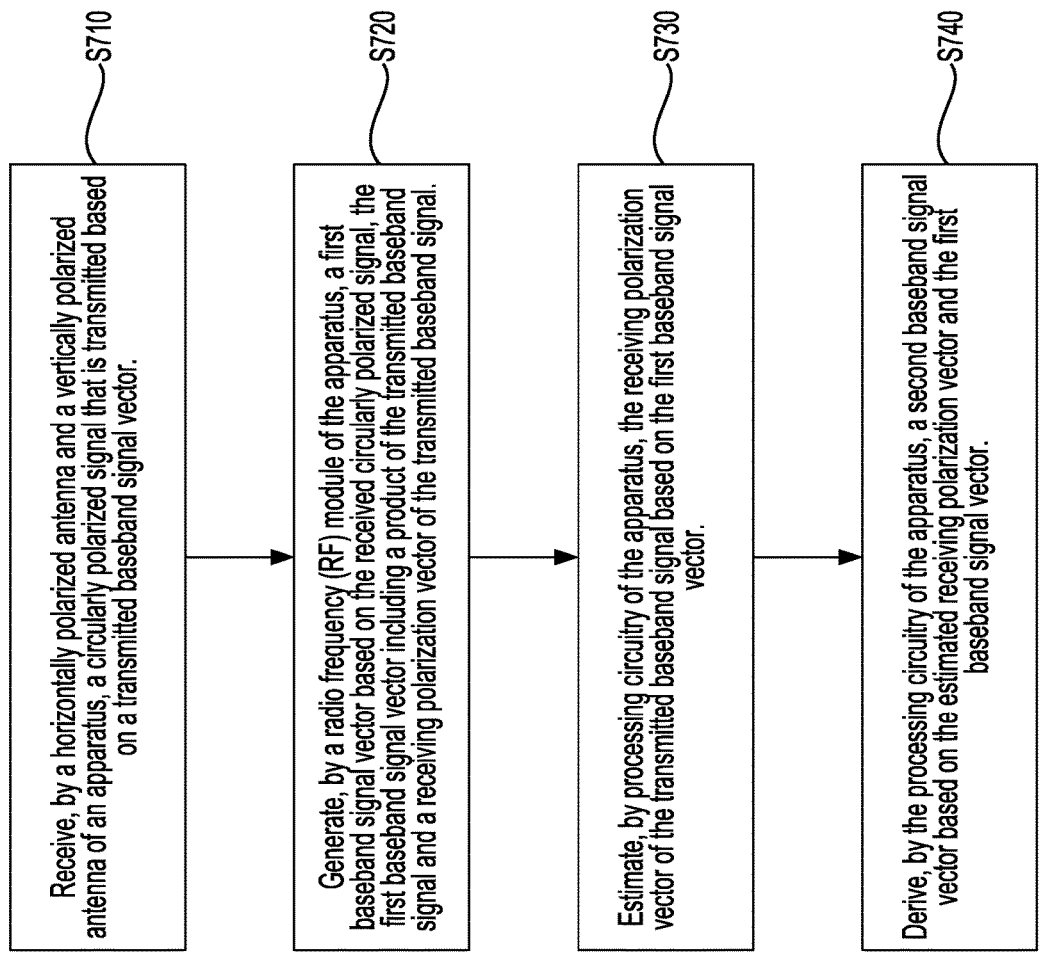
FIG. 7 shows a flowchart outlining a process for receiving a circularly polarized signal by linearly polarized antennas according to embodiments of the disclosure.

FIG. 7 shows a flowchart outlining a process 700 for receiving a circularly polarized signal by linearly polarized antennas according to embodiments of the disclosure. The process 700 can be executed by the apparatus 100. The process 700 may start at step S710.

At step S710, the process 700 receives, by a horizontally polarized antenna (e.g., the H-Antenna 140) and a vertically polarized antenna (e.g., the V-Antenna 150) of an apparatus (e.g., the apparatus 100), a circularly polarized signal that is transmitted based on a transmitted baseband signal vector. Then, the process 700 proceeds to step S720.

At step S720, the process 700 generates, by an RF module (e.g., the RF module 130) of the apparatus, a first baseband signal vector based on the received circularly polarized signal. The first baseband signal vector includes a product of the transmitted baseband signal vector and a receiving polarization vector of the transmitted baseband signal vector. Then, the process 700 proceeds to step S730.

At step S730, the process 700 estimates, by processing circuitry (e.g., the processing circuitry 110) of the apparatus, the receiving polarization vector of the transmitted baseband signal vector based on the first baseband signal vector. Then, the process 700 proceeds to step S740.

At step S740, the process 700 derives, by the processing circuitry of the apparatus, a second baseband signal vector based on the estimated receiving polarization vector and the first baseband signal vector. Then, the process 700 terminates.

In an embodiment, the first baseband signal vector includes a first sub-vector and a second sub-vector, the first sub-vector is generated from a first portion of the circularly polarized signal received by the horizontally polarized antenna, and the second sub-vector is generated from a second portion of the circular polarized signal received by the vertically polarized antenna.

In an embodiment, the process 700 estimates, by the processing circuitry of the apparatus, the receiving polarization vector of the transmitted baseband signal vector based on an eigenvector of an autocorrelation matrix of the first baseband signal vector.

In an embodiment, the process 700 normalizes, by the processing circuitry of the apparatus, the eigenvector as the receiving polarization vector.

In an embodiment, the transmitted baseband signal vector is a reference signal that is available to the apparatus, and the process 700 estimates, by the processing circuitry of the apparatus, the receiving polarization vector based on a linear channel estimation.

In an embodiment, the process 700 estimates, by the processing circuitry of the apparatus, a respective effective receiving polarization vector for each of signal samples in the transmitted baseband signal vector. The process 700 calculates, by the processing circuitry of the apparatus, an average of the effective receiving polarization vectors as the estimated receiving polarization vector.

In an embodiment, the reference signal is one of a Zadoff-Chu sequence, a maximum length sequence, or a constant amplitude zero autocorrelation sequence.

In an embodiment, the reference signal is allocated at beginning of a radio subframe.

In an embodiment, the reference signal uses different code sequences when transmitted over different beams.

In an embodiment, the reference signal on one beam is a discrete Fourier transform (DFT) or an inverse DFT of the reference signal on another beam.

In an embodiment, the process 700 generates, by the processing circuitry of the apparatus, a Hermitian transposed vector of the estimated effective polarization vector. The process 700 normalizes, by the processing circuitry of the apparatus, the Hermitian transposed vector as a normalized Hermitian transposed vector. The process 700 derives, by the processing circuitry of the apparatus, the second baseband signal vector based on an inner product of the normalized Hermitian transposed vector and the first baseband signal vector.

Figure 8:
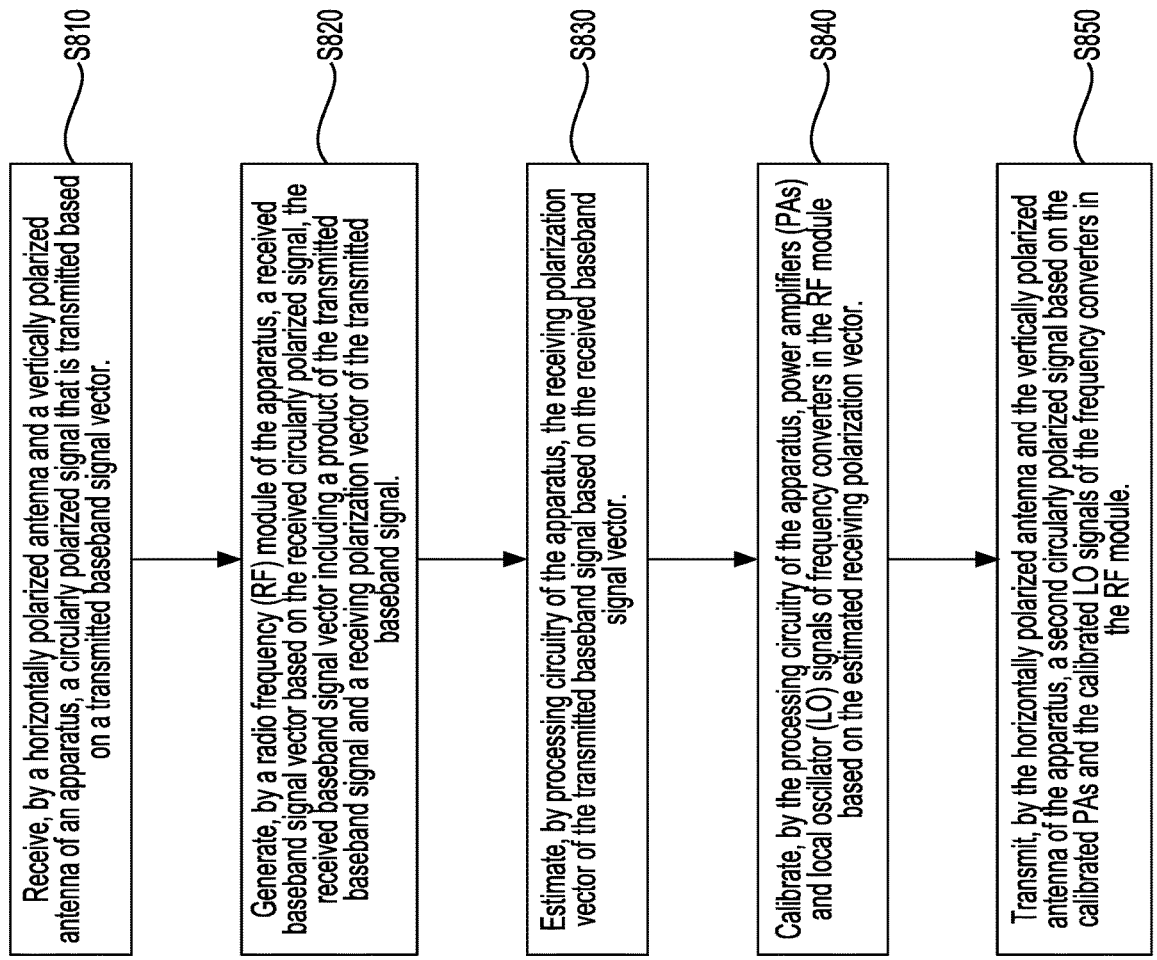
FIG. 8 shows a flowchart outlining a process for transmitting a circularly polarized signal by linearly polarized antennas according to embodiments of the disclosure.

FIG. 8 shows a flowchart outlining a process 800 for transmitting a circularly polarized signal by linearly polarized antennas according to embodiments of the disclosure. The process 800 can be executed by the apparatus 100. The process 800 may start at step S810.

At step S810, the process 800 receives, by a horizontally polarized antenna (e.g., the H-Antenna 140) and a vertically polarized antenna (e.g., the V-Antenna 150) of an apparatus (e.g., the apparatus 100), a first circularly polarized signal that is transmitted based on a transmitted baseband signal vector. Then, the process 800 proceeds to step S820.

At step S820, the process 800 generates, by an RF module (e.g., the RF module 130) of the apparatus, a received baseband signal vector based on the received first circularly polarized signal. The received baseband signal vector includes a product of the transmitted baseband signal vector and a receiving polarization vector of the transmitted baseband signal vector. Then, the process 800 proceeds to step S830.

At step S830, the process 800 estimates, by processing circuitry (e.g., the processing circuitry 110) of the apparatus, the receiving polarization vector of the transmitted baseband signal vector based on the received baseband signal vector. Then, the process 800 proceeds to step S840.

At step S840, the process 800 calibrates, by the processing circuitry of the apparatus, PAs (e.g., the PAs 204 and 206) and local oscillator (LO) signals of frequency converters (e.g., the frequency converters 211-218) in the RF module based on the estimated receiving polarization vector. Then, the process 800 proceeds to step S850.

At step S850, the process 800 transmits, by the horizontally polarized antenna and the vertically polarized antenna of the apparatus, a second circularly polarized signal based on the calibrated PAs and the calibrated LO signals of the frequency converters in the RF module. Then, the process 800 terminates.

In an embodiment, the received baseband signal vector includes a first sub-vector and a second sub-vector, the first sub-vector being generated from a first portion of the circularly polarized signal received by the horizontally polarized antenna, and the second sub-vector being generated from a second portion of the circular polarized signal received by the vertically polarized antenna.

In an embodiment, the process 800 estimates, by the processing circuitry of the apparatus, the receiving polarization vector of the transmitted baseband signal vector based on an eigenvector of an autocorrelation matrix of the received baseband signal vector.

In an embodiment, the process 800 normalizes, by the processing circuitry of the apparatus, the eigenvector as the receiving polarization vector.

In an embodiment, the transmitted baseband signal vector is a reference signal that is available to the apparatus, and the process 800 estimates, by the processing circuitry of the apparatus, the receiving polarization vector based on a linear channel estimation.

In an embodiment, the process 800 estimates, by the processing circuitry of the apparatus, a respective effective receiving polarization vector for each of signal samples in the transmitted baseband signal vector. The process 800 calculates, by the processing circuitry of the apparatus, an average of the effective receiving polarization vectors as the estimated receiving polarization vector.

In an embodiment, the reference signal is one of a Zadoff-Chu sequence, a maximum length sequence, or a constant amplitude zero autocorrelation sequence.

In an embodiment, the reference signal is allocated at beginning of a radio subframe.

In an embodiment, the reference signal uses different code sequences when transmitted over different beams.

In an embodiment, the reference signal on one beam is a discrete Fourier transform (DFT) or an inverse DFT of the reference signal on another beam.

In an embodiment, the process 800 determines, by the processing circuitry of the apparatus, calibrated amplifier gains of the PAs and a calibrated phase difference between the LO signals of the frequency converters based on the estimated receiving polarization vector. The process 800 configures, by the processing circuitry of the apparatus, the PAs and a phase shifter with the calibrated amplifier gains and the calibrated phase difference, respectively. The phase shifter generates a phase difference between the LO signals.

Figure 9:
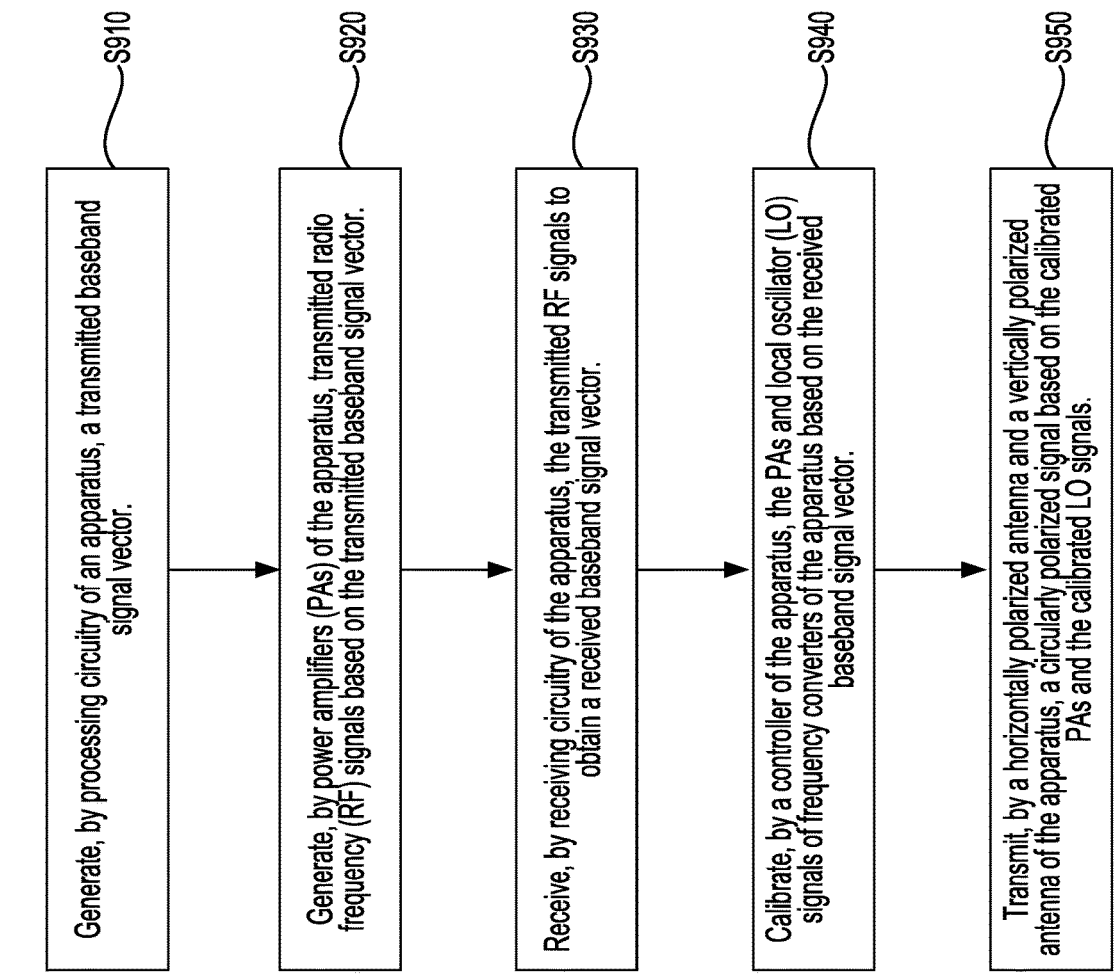
FIG. 9 shows a flowchart outlining another process for transmitting a circularly polarized signal by linearly polarized antennas according to embodiments of the disclosure.

FIG. 9 shows a flowchart outlining another process 900 for transmitting a circularly polarized signal by linearly polarized antennas according to embodiments of the disclosure. The process 900 can be executed by the apparatus 100. The process 900 may start at step S910.

At step S910, the process 900 generates, by processing circuitry (e.g., the processing circuitry 110) of an apparatus (e.g., an apparatus 100), a transmitted baseband signal vector. Then, the process 900 proceeds to step S920.

At step S920, the process 900 generates, by PAs (e.g., the PAs 204 and 206) of the apparatus, transmitted RF signals based on the transmitted baseband signal vector. Then, the process 900 proceeds to step S930.

At step S930, the process 900 receives, by receiving circuitry (e.g., the signal dividers 207 and 209, and the frequency down converters 211-212 and 215-216) of the apparatus, the transmitted RF signals to obtain a received baseband signal vector. Then, the process 900 proceeds to step S940.

At step S940, the process 900 calibrates, by a controller (e.g., the controller 225) of the apparatus, the PAs and LO signals of frequency converters (e.g., the frequency converters 211-218) of the apparatus based on the received baseband signal vector. Then, the process 900 proceeds to step S950.

At step S950, the process 900 transmits, by a horizontally polarized antenna (e.g., the H-Antenna 140) and a vertically polarized antenna (e.g., the V-Antenna 150) of the apparatus, a circularly polarized signal based on the calibrated PAs and the calibrated LO signals. Then, the process 900 terminates.

In an embodiment, the received baseband signal vector includes a first sub-vector and a second sub-vector, the first sub-vector is generated based on a first transmitted RF signal of the transmitted RF signals output from a first PA of the PAs coupled to the horizontally polarized antenna, and the second sub-vector is generated based on a second transmitted RF signal of the transmitted RF signals output from a second PA of the PAs coupled to the vertically polarized antenna.

In an embodiment, the process 900 calculates, by the controller of the apparatus, an eigenvector of an autocorrelation matrix of the received baseband signal vector. The process 900 determines, by the controller of the apparatus, calibrated amplifier gains of the PAs and a calibrated phase difference between the LO signals of the frequency converters based on the eigenvector of the autocorrelation matrix of the received baseband signal vector. The process 900 configures, by the controller of the apparatus, the PAs and a phase shifter with the calibrated amplifier gains and the calibrated phase difference, respectively. The phase shifter generates a phase difference between the LO signals.

In an embodiment, the eigenvector includes a first sub-vector generated based on the first sub-vector of the received baseband signal vector and a second sub-vector generated based on the second sub-vector of the received baseband signal vector, and the process 900 determines, by the controller of the apparatus, the calibrated amplifier gains based on a length ratio of the first and second sub-vectors of the eigenvector. The process 900 determines, by the controller of the apparatus, the calibrated phase difference between the LO signals based on an angle difference of the first and second sub-vectors of the eigenvector.

In an embodiment, the controller is included in the processing circuitry of the apparatus.

In an embodiment, the controller is outside the processing circuitry of the apparatus.

In an embodiment, the transmitted baseband signal vector is one of a Zadoff-Chu sequence, a maximum length sequence, or a constant amplitude zero autocorrelation sequence.

In an embodiment, the transmitted baseband signal vector is allocated at beginning of a radio subframe.

In an embodiment, the transmitted baseband signal vector uses different code sequences when transmitted over different beams.

In an embodiment, the transmitted baseband signal vector on one beam is a discrete Fourier transform (DFT) or an inverse DFT of the transmitted baseband signal vector on another beam.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for receiving a circularly polarized signal by linearly polarized antennas, the method comprising:
   receiving, by a horizontally polarized antenna and a vertically polarized antenna of an apparatus, a circularly polarized signal that is transmitted based on a transmitted baseband signal vector;
   generating, by a radio frequency (RF) module of the apparatus, a first baseband signal vector based on the received circularly polarized signal, the first baseband signal vector including a product of the transmitted baseband signal vector and a receiving polarization vector of the transmitted baseband signal vector;
   estimating, by processing circuitry of the apparatus, the receiving polarization vector of the transmitted baseband signal vector based on the first baseband signal vector; and
   deriving, by the processing circuitry of the apparatus, a second baseband signal vector based on the estimated receiving polarization vector and the first baseband signal vector.

2. The method of claim 1, wherein the first baseband signal vector includes a first sub-vector and a second sub-vector, the first sub-vector being generated from a first portion of the circularly polarized signal received by the horizontally polarized antenna, and the second sub-vector being generated from a second portion of the circular polarized signal received by the vertically polarized antenna.

3. The method of claim 1, wherein the estimating includes:
   estimating, by the processing circuitry of the apparatus, the receiving polarization vector of the transmitted baseband signal vector based on an eigenvector of an autocorrelation matrix of the first baseband signal vector.

4. The method of claim 3, wherein the estimating includes:
   normalizing, by the processing circuitry of the apparatus, the eigenvector as the receiving polarization vector.

5. The method of claim 1, wherein the transmitted baseband signal vector is a reference signal that is available to the apparatus, and the estimating includes:
   estimating, by the processing circuitry of the apparatus, the receiving polarization vector based on a linear channel estimation.

6. The method of claim 5, wherein the estimating includes:
   estimating, by the processing circuitry of the apparatus, a respective effective receiving polarization vector for each of signal samples in the transmitted baseband signal vector; and
   calculating, by the processing circuitry of the apparatus, an average of the effective receiving polarization vectors as the estimated receiving polarization vector.

7. The method of claim 5, wherein the reference signal is one of a Zadoff-Chu sequence, a maximum length sequence, or a constant amplitude zero autocorrelation sequence.

8. The method of claim 5, wherein the reference signal is allocated at beginning of a radio subframe.

9. The method of claim 5, wherein the reference signal uses different code sequences when transmitted over different beams.

10. The method of claim 9, wherein the reference signal on one beam is a discrete Fourier transform (DFT) or an inverse DFT of the reference signal on another beam.

11. The method of claim 1, wherein the deriving includes:
    generating, by the processing circuitry of the apparatus, a Hermitian transposed vector of the estimated effective polarization vector;
    normalizing, by the processing circuitry of the apparatus, the Hermitian transposed vector as a normalized Hermitian transposed vector; and
    deriving, by the processing circuitry of the apparatus, the second baseband signal vector based on an inner product of the normalized Hermitian transposed vector and the first baseband signal vector.

12. An apparatus for receiving a circularly polarized signal by linearly polarized antennas, the apparatus comprising:
    a horizontally polarized antenna and a vertically polarized antenna both configured to receive a circularly polarized signal that is transmitted based on a transmitted baseband signal vector;
    a radio frequency (RF) module configured to generate a first baseband signal vector based on the received circularly polarized signal, the first baseband signal vector including a product of the transmitted baseband signal vector and a receiving polarization vector of the transmitted baseband signal vector; and
    processing circuitry configured to
        estimate the receiving polarization vector of the transmitted baseband signal vector based on the first baseband signal vector, and derive a second baseband signal vector based on the estimated receiving polarization vector and the first baseband signal vector.

13. The apparatus of claim 12, wherein the first baseband signal vector includes a first sub-vector and a second sub-vector, the first sub-vector being generated from a first portion of the circularly polarized signal received by the horizontally polarized antenna, and the second sub-vector being generated from a second portion of the circular polarized signal received by the vertically polarized antenna.

14. The apparatus of claim 12, wherein the processing circuitry is further configured to:
   estimate the receiving polarization vector of the transmitted baseband signal vector based on an eigenvector of an autocorrelation matrix of the first baseband signal vector.

15. The apparatus of claim 14, wherein the processing circuitry is further configured to:
   normalize the eigenvector as the receiving polarization vector.

16. The apparatus of claim 12, wherein the transmitted baseband signal vector is a reference signal that is available to the apparatus, and the processing circuitry is further configured to:
   estimate the receiving polarization vector based on a linear channel estimation.

17. The apparatus of claim 16, wherein the processing circuitry is further configured to:
   estimate a respective effective receiving polarization vector for each of signal samples in the transmitted baseband signal vector; and
   calculate an average of the effective receiving polarization vectors as the estimated receiving polarization vector.

18. The apparatus of claim 16, wherein the reference signal is one of a Zadoff-Chu sequence, a maximum length sequence, or a constant amplitude zero autocorrelation sequence.

19. The apparatus of claim 16, wherein the reference signal is allocated at beginning of a radio subframe.

20. The apparatus of claim 12, wherein the processing circuitry is further configured to:
   generate a Hermitian transposed vector of the estimated receiving polarization vector;
   normalize the Hermitian transposed vector as a normalized Hermitian transposed vector; and
   derive the second baseband signal vector based on an inner product of the normalized Hermitian transposed vector and the first baseband signal vector.

* * * * *